Figure 1:
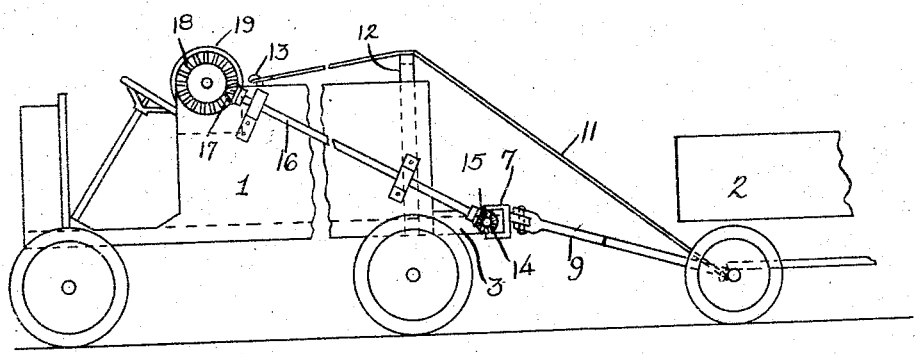

L. T. OLSON.
STEERING AND DRAFT APPARATUS FOR TRAILERS.
APPLICATION FILED MAR. 29, 1915.

1,162,946.  Patented Dec. 7, 1915.

WITNESS:

INVENTOR.
LOUES T. OLSON.

BY

ATTORNEY.

UNITED STATES PATENT OFFICE.

LOUES T. OLSON, OF DETROIT, MICHIGAN.

STEERING AND DRAFT APPARATUS FOR TRAILERS.

1,162,946.  Specification of Letters Patent.  Patented Dec. 7, 1915.

Application filed March 29, 1915. Serial No. 17,669.

*To all whom it may concern:*

Be it known that I, LOUES T. OLSON, a citizen of the United States, residing at Detroit, county of Wayne, State of Michigan, have invented a certain new and useful Improvement in Steering and Draft Apparatus for Trailers, and declare the following to be a full, clear, and exact description of the same, such as will enable others skilled in the art to which it pertains to make and use the same, reference being had to the accompanying drawings, which form a part of this specification.

This invention relates to steering and draft apparatus for vehicles used as trailers.

At the present time automobile trucks are not only arranged to carry a load but in many instances what is known as trailers are coupled therewith for carrying additional loads with the same power, and although the truck itself is so designed as to be readily handled in moving the truck to position to take on a load or to unload the same, it is a somewhat difficult matter to handle the trailing vehicle at the same time.

The object of this inventon is a simple and sufficient means for controlling the movement of a trailing vehicle by the operator of the truck in order that the said trailing vehicle may be moved simultaneously to loading or unloading position.

To this end the invention consists in the novel features of construction and arrangement of parts for the drawing of the trailing vehicle and in the controlling of the movement thereof by the operator of the truck.

Apparatus embodying the several novel features of the invention and the general mode of the operation thereof is shown in the accompanying drawings in which—

Figure 2:
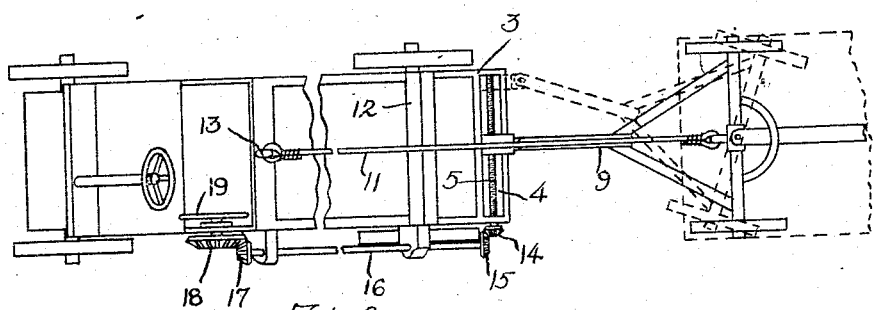
Figure 3:
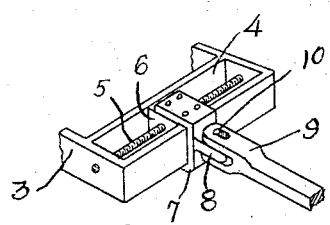

Figure 1 is a side elevation showing my improved apparatus for controlling movement of a trailing vehicle. Fig. 2 is a plan view thereof. Fig. 3 is a detail in perspective of part of the control apparatus.

Similar characters refer to similar parts throughout the drawing and specification.

The truck may be of any approved form preferably of the self-propelled type including a power plant (not here shown) but now well known in the art. 1 indicates such a truck and 2 shows the forward part of a trailing vehicle. In the embodiment of the invention here shown the side frames 3 of the truck extend to the rear and there provided with cross-pieces forming a rectangular recess 4, in which is mounted for revolution a screw-shaft 5, preferably of the square threaded type. In the compartment or recess 4, and on the screw-shaft is a traveling nut 6 preferably square as shown, and held from rotation by the side walls of the recess, and rotation of the shaft 5 moves the nut 6 to the right or left depending upon the direction of rotation of the shaft. Attached to the block or nut 6 is a yoke 7 provided with a rearwardly extending tongue 8 and to this tongue is attached the guiding tongue 9 of the trailer. The said tongue 9 is slotted at 10 and the pin extends through the bifurcated end of the tongue 9 and a hole in the tongue 8.

Preferably the trailer is drawn by means of a cable 11 attached centrally to the said axle and passing over a support 12 on the truck, the opposite end thereof engaging a hook 13 on the truck substantially as shown. The support 12 is directly over the rear axle of the truck 1. By means of the slot 10 heretofore mentioned, the tongue 9 may move backward relative to the tongue 8, the slot being of such length that the strain of the trailer load is taken by the cable 11, thus transferring the load, to a greater or less extent, to the support 12. To release the cable, the truck 1 may be backed up relative to the trailer 2, which slides the tongue forward and slackens the cable.

To conveniently operate the screw-shaft 5 from the operator's seat of the truck 1, a bevel gear 14 is provided on the outer end of the shaft 5 meshing with a similar gear on the end of the angularly positioned shaft 16, which is mounted on the side of the truck by means of brackets. The opposite end of the shaft 16 is provided with a bevel pinion 17 meshing with a bevel gear 18, mounted in a convenient part of the truck body or frame and on the same shaft with the gear 18, and adjacent the steering wheel of the truck, is a hand-wheel 19. By rotation of the wheel 19, the shaft 5 is rotated and the gear ratio is such that one rotation of the hand-wheel 19 will produce several revolutions of the screw-shaft and practically complete movement of the block 6 across the machine either to the right or left as may be desired.

The front axle of the trailer is of the usual type pivoted to swing in a horizontal plane as indicated by dotted lines in Fig. 2, and when the tongue 9 is moved to one side as shown by the said dotted lines, the trailer wheels are cramped, whereupon backward movement of the truck 1 will cause the trailer to turn in a circle as determined by the position of the block 6, and corresponding position of the front wheels of the trailer.

By this general arrangement of the steering and draft apparatus, a trailer of much larger capacity than is now commonly used may be utilized, as the said trailer may be handled in the same manner as an ordinary horse drawn wagon so far as its being moved backward or turned to the right and left to the desired position.

From the foregoing description it is evident that the operator of the truck may readily control the movement of the trailer as described, the control parts being of easy access to the operator and that by addition of these simple parts, to a self-propelled vehicle, additional loads may be readily and easily handled by one operator.

Having thus briefly described my invention, what I claim and desire to secure by Letters Patent of the United States is—

1. The combination with a vehicle, of means for drawing and guiding a trailing vehicle consisting of a draft cable detachably secured to both vehicles, a bridge on the forward vehicle over which the cable extends and guiding apparatus for the trailing vehicle consisting of a screw shaft secured to the forward vehicle, a traveling nut on the shaft, the tongue of the trailer being attachable to the traveling nut in a manner to allow a limited relative movement to take up the slack in the cable, and means for rotating the screw shaft.

2. The combination with a vehicle, of means for drawing and guiding a trailing vehicle consisting of a draft cable attachable to both vehicles, a bridge directly over the rear axle of the forward vehicle over which the draft cable draws, and guiding means for the trailing vehicle comprising a screw shaft mounted for rotation at the rear of the forward vehicle, a traveling nut on the shaft, there being a way for the nut preventing rotation thereof with the shaft, a yoke attached to the nut provided with a rearwardly extending tongue or lug, said trailer tongue being slotted, a pin engaging the lug and the slots in the trailer tongue to allow a limited relative movement between the trailer tongue and block sufficient to take up the slack of the cable and free the guiding apparatus of the load, a steering gear near the forward end of the vehicle, and means connecting the steering gear and screw shaft whereby said shaft may be rotated to move the nut or block transversely of the vehicle substantially as described.

3. The combination with a vehicle, of means for drawing and guiding a trailing vehicle, comprising a block movable transversely of the forward vehicle at the rear end thereof and provided with means for attaching the tongue of the trailer, the connection between the said tongue and the block allowing a limited relative movement therebetween, a draft cable attached to the trailer and forward vehicles respectively, and a bridge on the forward vehicle over which the cable extends, the limited movement of the tongue and block being sufficient to allow for the slack in the cable, and means adjacent the operator's seat for moving the block.

In testimony whereof, I sign this specification.

LOUES T. OLSON.